United States Patent [19]
Amdahl et al.

[11] 3,828,175
[45] Aug. 6, 1974

[54] METHOD AND APPARATUS FOR DIVISION EMPLOYING TABLE-LOOKUP AND FUNCTIONAL ITERATION

[75] Inventors: Gene M. Amdahl, Saratoga; Michael R. Clements, Santa Clara, both of Calif.

[73] Assignee: Amdahl Corporation, Sunnyvale, Calif.

[22] Filed: Oct. 30, 1972

[21] Appl. No.: 302,223

[52] U.S. Cl. .............................................. 235/164
[51] Int. Cl. .............................................. G06f 7/52
[58] Field of Search ............ 235/164, 159, 160, 156

[56] References Cited

UNITED STATES PATENTS

| | | | |
|---|---|---|---|
| 3,591,787 | 7/1971 | Freiman | 235/164 |
| 3,633,018 | 1/1972 | Huei Ling | 235/164 |
| 3,648,038 | 3/1972 | Sierra | 235/164 |

OTHER PUBLICATIONS

M. J. Flynn, "On Division by Functional Interation," IEEE Trans. on Computers, Vol. C–19, No. 8, Aug. '70, pp. 202–206.

*Primary Examiner*—Charles E. Atkinson
*Assistant Examiner*—David H. Malzahn
*Attorney, Agent, or Firm*—Flehr, Hohbach, Test, Albritton & Herbert

[57] ABSTRACT

Disclosed is a divide method and a divide apparatus for use in a data processing system. A given dividend, No, and a given divisor, Do, are used to calculate a quotient Q. The quotient Q consists of the quotient bytes Q(O), Q(*l*),...,Q(*i*), Q(*i*+*l*),...,Q(*n*–*l*). The quotient bytes Q(*i*) are formed in successive iterations of the equation $$[Q(i)](dp)+r(i) = Q(i+l),\ r(i+l)$$

were (dp) is the iteration multiplier and *r*(*i*) is the $i^{th}$ truncated remainder resulting after truncating the Q(*i*) byte from the previous iteration. The iteration multiplier (dp) equals 1-(D) $(Dp)^{-1}$ where $(Dp)^{-1}$ is an approximate reciprocal divisor. The value of (Dp) is made greater than D using a table lookup approximation of D and employing an initial calculation sequence thereby insuring that only summations are required in the iterations.

7 Claims, 3 Drawing Figures

METHOD AND APPARATUS FOR DIVISION EMPLOYING TABLE-LOOKUP AND FUNCTIONAL ITERATION

CROSS REFERENCE TO RELATED APPLICATIONS

DATA PROCESSING SYSTEM, Ser. No. 302,221, filed Oct. 30, 1972, invented by Gene M. Amdahl and Glenn D. Grant and assigned to AMDAHL CORPORATION.

BACKGROUND OF THE INVENTION

The present invention relates to the field of data processing systems and specifically to the field of dividers and methods for dividing within data processing systems.

Prior art data processing systems usually include within their instruction set, instructions which require divisions of numbers using either fixed point or floating point algorithms.

Prior art methods and apparatus for executing divide instructions typically employ combinations of adders and other functional units rather than employing a single dedicated divide apparatus. The quotient Q is calculated from a given divisor Do and a given dividend No using an iterative process or algorithm requiring many cycles of the system.

In order to simplify the calculations, approximations of the given dividend and given divisor are frequently employed so that inaccuracies, within predetermined limits, may be introduced into the quotient. In prior art iteration sequences, the iteration approximations cause intermediate results which are both positive and negative thereby requiring both addition and subtraction steps in order that the quotient be accurately formed. While such iteration sequences produce acceptable results, the requirement of having to keep track of positive and negative remainders is undesirably complex and may necessitate additional circuitry which adds to the expense of the data processing system.

SUMMARY OF THE INVENTION

The present invention is a method of division and divider apparatus for use in a data processing system. A given dividend No and a given divisor Do are used to calculate a quotient Q. The quotient Q consists of the quotient bytes $Q(0)$, $Q(l)$,...,($Q(i)$, $Q(i+l)$, ...,$Q(n-l)$. Those quotient bytes $Q(i)$ after $Q(O)$ are formed in successive iterations of the following general form:

$$[Q(i)](dp)+r(i) = R(i+1) = Q(i+l), r(i+l)$$

where $(dp)$ is the iteration multiplier and $r(i)$ is the $i^{th}$ truncated remainder resulting after truncating $Q(i)$ from the previous iterations. The iteration multiplier $(dp)$ equals $1\text{-}D(Dp)^{-1}$ where $(Dp)^{-1}$ is an approximate reciprocal divisor and where $D$ is the binary normalized Do. For quotient bytes $Q(i)$ each of $x$ binary bits, $(Dp)$ does not differ from $D$ by more than 1 part in $2^x$. The approximate reciprocal divisor $(Dp)^{-1}$ and the iteration multiplier $(dp)$ are determined during an initial calculation using a table-lookup approximate reciprocal divisor $(Dt)^{-1}$. The table-lookup approximation $(Dt)^{-1}$ is selected so that $(Dt)$ does not differ from $D$ by more than one part in $2^{(x/2)}$. Through the initial calculations, the first quotient byte $Q(0)$ is produced and the approximate reciprocal divisor $(Dp)^{-1}$ is derived from the approximate reciprocal divisor $(Dt)^{-1}$.

Because the approximate reciprocal divisors $(Dp)^{-1}$ and $(Dt)^{-1}$ are less than the exact reciprocal of the divisor $D$, the remainders, $r(i)$, are always less than the remainders which would be formed if the exact reciprocal divisor Do were employed. Accordingly, the addition of $Q(i)$ $(dp)$ to $r(i)$ is always of the same sign.

In accordance with the above summary, the present invention achieves the object of accurately forming a quotient $Q$ from a given divisor Do and a given dividend No by an iterative process of forming quotient bytes by adding a truncated remainder to the product of the last quotient byte and an iterative multiplier $(dp)$ to form the next quotient byte and the next remainder.

Additional objects and features of the invention will appear from the following description in which the preferred embodiments of the invention have been set forth in detail in conjunction with the drawings.

DESCRIPTION OF THE PREFERRED EMBODIMENTS

Overall System

Figure 1:
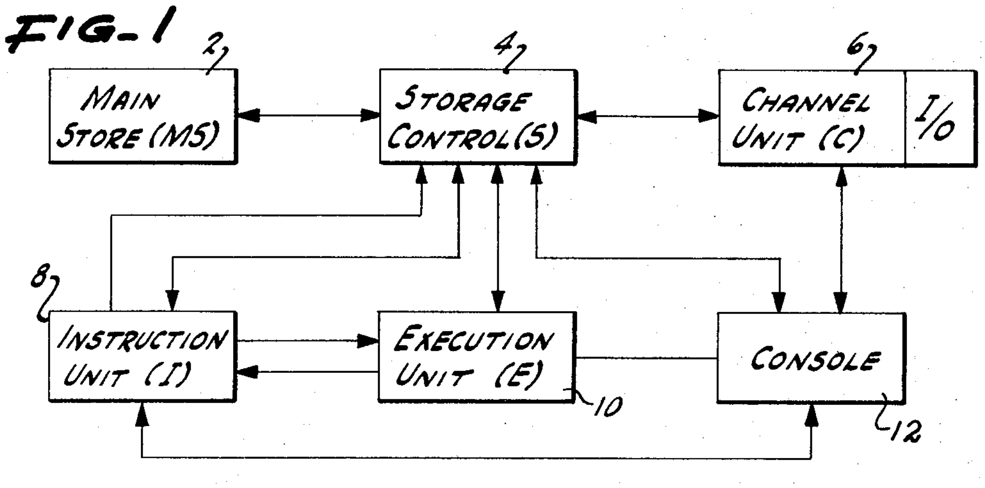
FIG. 1 depicts a block diagram of a basic environmental system suitable for employing the divide method and apparatus of the present invention.

In FIG. 1, a basic environmental processing system is shown which is suitable for employing the divider and division method of the present invention. Briefly, that system includes a main store 2, a storage control unit 4, instruction unit 8, an execution unit 10, a channel unit 6 with associated *I/O*, and a console 12. In accordance with well known principles, the data processing system of FIG. 1 operates under control of a stored program of instructions. Typically, instructions and the data upon which the instructions operate are introduced from the *I/O* equipment via the channel unit 6 through the storage control unit 4 into the main store 2. From the main store 2, instructions are fetched by the instruction unit 8 through the storage control 4, and are decoded to control the execution of instructions. Execution unit 10 executes instructions decoded in the instruction unit 8 and operates upon data communicated to the execution unit from the appropriate places in the system.

Execution Unit

Figure 3:
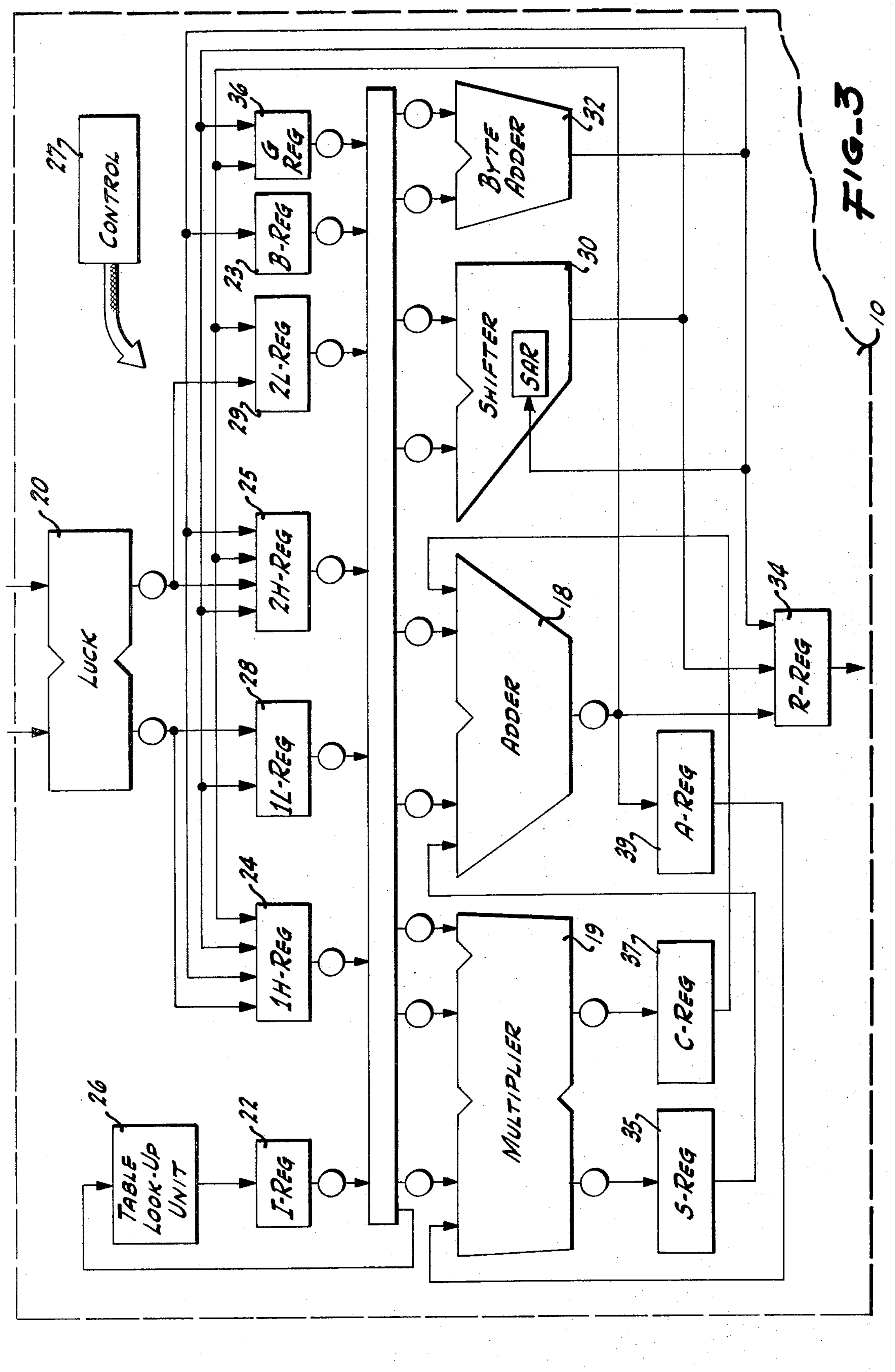
FIG. 3 depicts a schematic representation of the data paths and apparatus associated with the execution unit of the system of FIG. 1 and wherein division instructions are executed.

In FIG. 3, the execution unit 10 of the system of FIG. 1 is shown in further detail. The execution unit has a plurality of functional units including a multiplier 19, an adder 18, a shifter 30, a byte adder 32 and a LUCK unit 20 for performing logical and comparison operations. Those functional units are typically implemented using apparatus and techniques well known in the data processing field. In addition to the functional units, the execution unit 10 includes a plurality of registers which function to store, to ingate and to outgate data from the various functional units in controlled steps pursuant to executing the programmed instructions of the data processing system of FIG. 1. Specifically, those registers are an I register 22, a 1H register 24, a 1L register 28, a 2H register 25, a 2L register 29, a B register 23, a G register 36, an S register 35, a C register 37, an A register 39 and an R register 34.

Additionally, the E unit 10 also includes a control 27 which controls in a conventional manner the ingating, outgating and other timing associated with execution unit 10.

The execution unit 10 also includes a table-lookup unit 26. The table-lookup unit 26 receives as an input the higher order divisor bits when a divide instruction is being performed and provides as an output an approximate divisor reciprocal for use in establishing an iteration multiplier. The table-lookup unit includes conventional logic decoding circuitry further described hereinafter.

While the general nature and operation of an execution unit like that in FIG. 10 is well known, certain specific features are explained in further detail in connection with the divide algorithm of the present invention.

Divide Algorithm Background

In accordance with the present invention, an iterative process is executed to form a quotient $Q$ from a given dividend $N$ and a given divisor $D$. In general, $N/D$ identically equals a quotient $Q$ with some exact remainder R as follows:

$$N/D = Q + R/D \qquad (1)$$

The quotient $Q$ can be expressed as an ordered sequence of bytes $Q(i)$ which are explicitly $Q(O)$, $Q(l)$,...,$Q(i)$, $Q(i+l)$, ...,$Q(n-l)$.

Each of the $Q(i)$ bytes may be determined by obtaining the $Q(i+l)$ byte from the previous remainder $R(i)$ as follows:

$$[R(i)]D^{-1} = Q(i+1) + [R(i+1)]D^{-1} \qquad (2)$$

In Eq. 2, the initial value of $R(i)$ equals $N$. Since $D^{-1}$ is generally not available with sufficient accuracy or multiplication by $D^{-1}$ cannot be carried out with sufficient accuracy, an approximation $(Dp)^{-1}$ is employed where $(Dp)$ is an approximation of $D$. In order to effectively use that approximation, care must be taken to insure the ultimate accuracy desired. To develop the relationship, Eq. 2 is transformed as follows:

$$R(i) - Q(i+1)D = R(i+l) \qquad (3)$$

Further, each term in Eq. 3 is multiplied by $(Dp)^{-1}$ as follows:

$$R(i)\ (Dp)^{-1} - Q(i+1)D(Dp)^{-1} = [R(i+1)](Dp)^{-1} \qquad (4)$$

Using the form of Eq. 2 in Eq. 4 where $(Dp)^{-1}$ equals $(1-dp)D^{-1}$ and letting the asterisk (*) indicate possibly inexact quantities resulting from introducing the approximation $(Dp)^{-1}$ rather than using only the exact value $D^{-1}$ yields:

$$Q^*(i+1)+[R^*(i+1)](Dp)^{-1}-[Q(i+1)](1-dp)=Q^*(i+2)+[R^*(i+2)](Dp)^{-1} \qquad (5)$$

With proper selection of $(dp)^{-1}$ and therefore of $(dp)$ in Eq. 5, $Q^*\ (i+1)$ equals $Q(i+1)$ and $Q(i+2)$ equals $Q^*(i+2)$ so that Eq. 5 becomes:

$$[R^*(i+1)](Dp)^{-1}+(dp)\ [Q(i+1)]=Q(i+2)+[R^*(i+2)](Dp)^{-1} \qquad (6)$$

Rewriting Eq. 6 letting $i = (i-1)$ yields:

$$[R^*(i)](Dp)^{-1} + (dp)\ [Q(i)] = Q(i+1)+[R^*(i+1)](Dp)^{-1} \qquad (7)$$

Eq. 7 indicates that the quotient bytes $Q(i)$ may be formed using the approximate remainders $R^*(i)$. In performing calculations pursuant to Eq. 7, $Q(i+1)$ can be formed as the high order bits where $[R^*(i+1)](Dp)^{-1}$ is the remaining low order bits, $r(i+1)$, in which case Eq. 7 becomes, $$r(i)+(dp)\ [Q(i)] = Q(i+1),\ r(i+1) \qquad (8)$$

In. Eq. 8 the initial values, $r(o)$ and $Q(o)$ for $r\ (i)$ and $Q(i)$ are established by multiplying the dividend $N$ by an appropriately chosen reciprocal divisor $(Dp)^{-1}$. The appropriate selection of the approximate reciprocal divisor $(Dp)^{-1}$ besides establishing $r(o)$ and $Q(o)$ establishes the value for the iteration multiplier $(dp)$.

Several factors are considered in establishing the iteration multiplier $(dp)$. First, the value of $(Dp)^{-1}$ must be accurate enough to insure that the possibly inexact byte $Q^*(i+2)$ is in fact identically equal to the exact byte $Q(i+2)$ as previously discussed in connection with Eq. 5 above. Specifically, where the bytes $Q(i)$ are eight bits in binary notation, each byte represents a value up to $2^8$. Accordingly, in order that the high order byte $Q^*(i+2)$ in Eq. 2 not be affected by inaccuracy the approximate divisor $(Dp)$ must differ from the actual divisor $D$ by less than one part in $2^8$, that is, $(Dp)$ should differ from $D$ by less than $2^{-8}$ and for $x$ bit bytes $(Dp)$ should differ by less than $2^{-x}$.

Another factor to consider in establishing the iteration multiplier $(dp)$ is the technique of and apparatus for establishing the approximate reciprocal divisor $(Dp)^{-1}$. Still further, the capacity of the data processing system for handling multiplicands of limited bit length must be considered.

In accordance with the present invention and in view of the above factors, $(Dp)^{-1}$ is obtained by an initial calculation. First, a table-lookup unit is addressed by the seven high-order bits of the normalized divisor $D$ to provide a table-lookup approximate reciprocal divisor $(Dt)^{-1}$. The table is constructed such that $(Dt)$ differs from $D$ by amounts not greater than $2^{-5}$. The table-lookup reciprocal divisor $(Dt)^{-1}$ is used to calculate the approximate reciprocal divisor $(Dp)^{-1}$. The calculation is carried out so as to insure that $(Dp)$ differs from $D$ by amounts less than $2^{-10}$.

In converting the table-lookup reciprocal divisor $(Dt)^{-1}$ to $(Dp)^{-1}$, $(Dt)^{-1}$ is first multiplied by $D$ forming the quantity $(1-dt)$ as follows:

$$(Dt)^{-1}(D) = (1-dt) \qquad (9)$$

Next, the two's complement of the quantity $(1-dt)$ is taken to form the quantity $1+(dt)$ as follows:

$$[1-(dt)]'' = 2-[1-(dt)] \quad (10)$$

$$[1-(dt)]'' = [1+(dt)] \quad (11)$$

Finally, the quantity $[1+(dt)]$ is multiplied by $(Dt)^{-1}$ as to produce $(Dp)^{-1}$ follows:

$$[1+(dt)]\,(Dt)^{-1} = (Dp)^{-1} \quad (12)$$

Because the divisor $D$ is binary normalized, that is, all high-order 0's are truncated, the value of $D$ is less than 1 and is greater than or equal to one-half. Also, $(Dt)$ does not differ from $D$ by more than $2^{-5}$. Accordingly, the product of $(Dt)^{-1}D$ of Eq. 10 is less than $(1-2^{-5})$ so that $(dt)$ in Eq. 9 is less than $2^{-5}$.

From Eq. 9 it is clear that $(Dt)^{-1}$ is less than $(1-dt)$. Using $(Dt)^{-1}$ in Eq. 12 as less than $(1-dt)$ establishes $(Dp)^{-1}$ as less than the product of $1+dt$ and $1-dt$ as follows:

$$[1+(dt)]\,[1-(dt)] > (Dp)^{-1} \quad (13)$$

$$[1-(dt)^2] > (Dp)^{-1} \quad (14)$$

The product $[1+dt]\,[1-dt]$ of course yeilds the product $1-(dt)^2$. Since $(dt)$ was established as less than $2^{-5}$, $(dt)^2$ in Eq. (14) is less than $2^{-10}$. In accordance with Eq. 14, $(Dp)$ is established as differing from $D$ by a value less than $2^{-10}$ as desired. Using the established value of $(Dp)^{-1}$ the iteration multiplier $(dp)$ is formed by multiplying $(Dp)^{-1}$ by $D$ and forming the one's complement of the product. Having thereby established the iteration multiplier dp, Eq. 8 is repeatedly iterated to establish the Q $(i)$ quotient bytes in accordance with the method of the present invention which is now more explicitly described.

Divide Method

The divide method of the present invention operates upon a given divisor *Do* and a given dividend *No* to calculate a quotient $Q$ in accordance with the following steps.

Step 1. Binary normalize *Do* by truncating y high-order 0's to form $D$ and shift *No* $Y$ bits to form $N$.

Step 2. Use high order bits of $D$ to address table-lookup logic to obtain $(Dt)^{-1}$ where $1/D \geq 1/(Dt)$ and therefore $(Dt) \geq D$ and $D/(Dt) \leq 1$.

Step 3. Multiply $(Dt)^{-1}$ by $D$:

$$(Dt)^{-1}\,(D) = 1-dt \quad \text{Exp. I}$$

Step 4. Form two's complement of $[1-(dt)]$:

$$[1-(dt)]'' = 2-[1-(dt)] = [1+(dt)] \quad \text{Exp. II}$$

Step 5. Multiply $[1+(dt)]$ by $(Dt)^{-1}$:

$$[1+(dt)](Dt)^{-1} = (Dp)^{-1}$$
$$\therefore (Dp)^{-1} \geq (Dt)^{-1}$$
$$\therefore (Dp) \leq (Dt)$$
$$\therefore 1.00\cdots0 > D/(Dp) > D/(Dt) \quad \text{Exp. III}$$

Step 6. Multiply $(Dp)^{-1}$ by $D$:

$$(Dp)^{-1}(D) = [1-(dp)]$$
$$\therefore (dp) = [1-(Dp)^{-1}(D)] \quad \text{Exp. IV}$$

Step 7. Form one's complement of $[1-(dp)]$:

$$[1-(dp)]' = 1-[1-(dp)] = (dp) \quad \text{Exp. V}$$

Step 8. Multiply $(Dp)^{-1}$ by $N$:

$$(Dp)^{-1}(N) = Q(O),\ r(O) \quad \text{Exp. VI}$$

Step 9. Multiply $Q(O)$ by $(dp)$ and add result to $r(O)$
$Q(O)(dp)+r(O) = Q(1), r(1)$ Exp. VII Step 10. Multiply $Q(i)$ by $(dp)$ and add result to $r(i)$ for $i = 1,\ldots,(n-1)$: $[Q(i)](dp)+r(i) = Q(i+1), r(i+1)$ Exp. VIII where:

*No* = given dividend
$N$ = normalized No shifted y-bits
*Do* = given divisor
$D$ = binary normalized Do, truncated y-bits
$Q$ = calculated quotient having $Q(i)$ bytes $Q(0), Q(1), \ldots, Q(i), Q(i+1), \ldots, Q(n-1)$
$(Dt)^{-1}$ = table lookup approximate reciprocal divisor
$(dt) = l-D(Dt)^{-1}$ = initial multiplier
$(Dp)^{-1}$ = calculated approximate reciprocal divisor
$(dp) = 1-D(Dp)^{-1}$ = iterative multiplier
$Q(i) = i^{th}$ calculated byte of the quotient $Q$
$r(i) = i^{th}$ truncated remainder formed by truncating $Q(i)$ from $Q(i), r(i)$
$i = 0, 1, 2, \ldots, (n-1)$ = iterative steps
$n$ = number of quotient bytes, 4 for single word accuracy and 8 for double word Note that the method outlined in the above steps is consistent with the equations and discussion in the above Divide Algorithm Background. Specifically, the iteration of Exp. VIII is identical to that previously discussed in connection with Eq. 8. Similarly, the formation of the iteration multiplier $(dp)$ of Exp. V is in accordance with the discussion of Eqs. 9 through 12. Because the approximate reciprocal divisor $(Dp)$ is greater than the reciprocal divisor $D^{-1}$, each new remainder $r(i+1)$ is smaller than the remainder which would be obtained if the exact divisor $D$ were employed rather than the approximate divisor *Dp*. In each instance, the addition of the product $(dp)$ and $Q(i)$ is necessary to increase the quantity $r(i)$ in order to insure that the next quotient byte $Q(i+1)$ is without error. Because $r(i+1)$ is always generated smaller than the actual remainder, addition is always required; therefore, it is not necessary to keep track of the sign of the remainder.

Divide Apparatus

Figure 2:
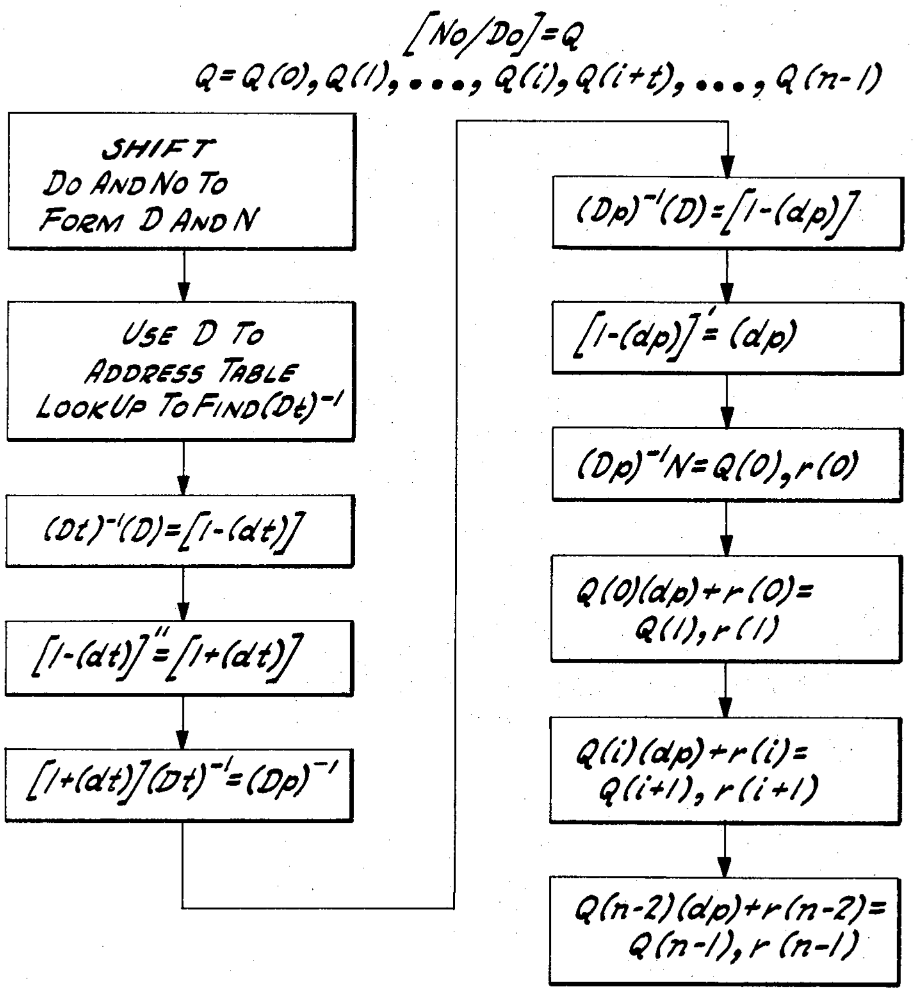
FIG. 2 depicts a flow chart of the method steps of the present invention.

The execution unit 10 of the system of FIG. 1 carries out the divide method depicted in FIG. 2 using the apparatus of FIG. 3. Referring to FIG. 3, the execution unit executes a divide instruction by fetching through the LUCK unit 20 the dividend *No* to the 1*H* and 1*L* registers 24 and 28 and the divisor *Do* to the 2*H* register 25.

In Step 1, the dividend No is transferred, by conventional means under control of control unit 27, from the 1H and 1*L* registers to the 2*H* and 2*L* registers while the divisor Do is transferred from the 2*H* register to the 2*L* register to the 1*L* register through the LUCK unit 20 where the number, *y,* of high order 0's is counted, and placed in the SAR register 38 in the shifter 30. The divisor Do is transferred from the 1*L* register through the shifter 30 where it is shifted y bits to form the normalized divisor D which is placed in the 1*L* register. Simultaneously, with placing the divisor *D* in the 1*L* register, the seven high order bits of *D* are placed in the 1*H* register.

In Step 2, the high order bits of *D* from the 1*H* register are gated as an input to the table lookup unit 26 which produces as an output the approximate divisor $(Dt)^{-1}$ which is stored in the *I* register 22.

In Step 3, the approximate divisor $(Dt)^{-1}$ is multiplied by *D* by transferring *D* from the 1*L* register and $(Dt)^{-1}$ from the *I* register through the multiplier placing the product $(1-dt)$ in the 2*H* and 2*L* registers via the *S* and *C* registers 35 and 37 and the adder 18. That result is then truncated to 32 bits leaving the results in the 2*H* register.

In Step 4, the two's complement of the contents of the 2*H* register are formed by passing that value through the adder 18 and placing the result $[1+(dt)]$ in the 1*L* register. Simultaneously therewith, the divisor *D* is transferred from the 1*L* register to the 2*H* register.

In Step 5, $(1+dt)$ from the 1*L* register and *D* from the 2*H* register are gated to the multiplier and the product of those terms is placed in the 1*H* and 1*L* registers thereby forming the approximate reciprocal divisor $(Dp)^{-1}$. From the 1*H* and 1*L* registers, the approximate divisor is transferred to the *I* register truncating the lower order bits.

In Step 6, $(Dp)^{-1}$ from the *I* register and *D* from the 1*L* register are gated to the multiplier 19 and the product $[1-(dp)]$ after passing through the *S* and *C* registers and adder 18 is placed in the *A* register 39.

In Step 7, the contents of the *A* register are gated through the adder 18 to form the one's complement and form the iteration multiplier (*dp*) which is placed in the *R* register.

In Step 8, concurrently during the performance of Step 7, the product of $(Dp)^{-1}$ and *N* is formed placing the results in the 1*L*, 2*H*, 2*L* and *A* registers for the remainder portion *r*(0) and the high order byte *Q*(0) in the *I* register.

In Step 9, *Q*(0) from the *I* register is multiplied by the iteration multiplier (*dp*) from the *R* register via the 1*H* register via multiplier 19 while the *r*(*O*) remainder is simultaneously gated from the *A* register to the multiplier 19. The result of the simultaneous multiplication and addition according to Exp. VII above places the remainder *r*(1) in the *A* register and the new quotient byte *Q*(1) in the *I* register. Prior to placing the new byte *Q*(1) in the I register, the prior first byte *Q*(0) is transferred from the *I* register to the 2*H* register. Thereafter, the *Q*(0) and *Q*(1) bytes are accumulated in the 2*L* register in preparation for the next step.

In Step 10, the *Q*(1) byte from the I register and the *r*(1) remainder in the *A* register are multiplied by the iteration multiplier (*dp*) and added in accordance with Exp. VIII above placing the new byte *Q*(2) in the I register while forming the new remainder in the A register and accumulating the bytes Q(0), Q(1) and Q(2) in the 2L register.

Thereafter, the iteration in accordance with Exp. VIII continues, gating the most recently formed byte from the *I* register to the multiplier along with the iteration multiplier (*dp*) from the 1*H* register and the previously obtained remainder from the *A* register. Accumulation continues in the 2*L* register until the divide algorithm is completed.

The table lookup unit 26 in FIG. 3 in one preferred embodiment is a logical decoding apparatus which is addressed by the seven high order bits of the divisor *D*. While a logical implementation is preferred, the information can alternatively be stored in main store or other storage areas in the data processing system. For example, each of the locations defined by the seven high order bits of the divisor *D* can be loaded with the correct reciprocal divisor determined in accordance with the following algorithm.

$$(Dt)^{-1} = [1/(D\underline{\$7}+1)]\underline{\$7}$$

where:

$(Dt)^{-1}$ = the output from the table lookup unit $D$ = the divisor input to the table lookup unit $\underline{\$7}$ = truncation to seven bits For a specific example of how the above algorithm is employed in forming the information used to load the table with the desired approximate reciprocal divisors, a typical divisor *D* is selected and expressed in binary notation as 0.10000110. The quantity $D\underline{\$7}$ is 0.1000011 which is truncated value of *D* to seven significant bits. The quantity $(D\underline{\$7}+1)$ is equal to 0.1000100. The value of $[1/(D\underline{\$7}+1)]$ is 1.11100001. The quantity $[1/(D\underline{\$7}+1)]\underline{\$7}$ is 1.111000.

In summary, for a divisor *D* equal to 0.10000110 the table lookup approximate reciprocal divisor $(Dt)^{-1}$ is 1.111000.

Since the approximate reciprocal divisors $(Dt)^{-1}$ and $(Dp)^{-1}$ are less than the actual reciprocal divisor $D^{-1}$, the algebraic additions of Expressions VII and VIII above were always the same sign and more specifically were always a positive sign. Alternatively, the present invention may be implemented by selecting $(Dt)^{-1}$ and $(Dp)^{-1}$ greater than $D^{-1}$. When the approximate reciprocal divisors are selected, greater, than the algebraic additions of Expressions VII and VIII are still always of the same sign, but that sign is negative.

Specific Divide Example

As a specific example of the divide method of the present invention, the dividend No and the divisor *Do* are given in hexidecimal format as follows:

$No = 0123456789ABCDEF$
$Do = 02468ADO$

The quotient $Q$, in hexadecimal format, calculated from the above dividend and divisor is as follows:

$$Q = 0.7FFFFFCC$$

The steps performed in calculating the above quotient $Q$ are summarized in the following TABLE I.

TABLE I

Step 1

Since for $Do$ the leading high order bits (ignoring the first bit which is a sign bit) are $O1$(Hex) which equals 00000001(binary), $Do$ has six leading $O$'s so $Do$ and $No$ are shifted left six bits to form:

$$D = 0.91A2B400(\text{Hex})$$
$$N = 0.48D159E26AF37BCO(\text{Hex})$$

Step 2

The seven high order bits of $D$, where 91(Hex) equals 10010001(binary), are 1001000 and those seven bits are used to address the table lookup to obtain:

$$(Dt)^{-1} = \mathbf{1.11000000}(\text{binary})$$
$$= 1.CO(\text{Hex})$$

Step 3

Multiply $D$ which is equal to 0.91A2B400(Hex) by $(Dt)^{-1}$ which is equal to 1.CO(Hex):

$(Dt)^{-1}D = [1-(dt)] = $ O..FEDCBBOOOO

Step 4

Two's complement $[1-(dt)]$:

$[1-(dt)]'' = [1+(dt)] = 1.0123450000$

Step 5

Multiply $[1+(dt)]$ by $(Dt)^{-1}$:

$[1+(dt)](Dt)^{-1} = (Dp)^{-1} = $ 1.C1FDB8C0000

Step 6

Multiply $(Dp)^{-1}$ by D:

$D(Dp)^{-1} = [1-(dp)] = 0.$FFFEB49AOF6

Step 7

One's complement $[1-(dp)]$:

$[1-(dp)]' = (dp) = 0.$00014B65FOA

Step 8

Multiply $(Dp)^{-1}$ by $N$:

$(Dp)^{-1}N = Q(O), r(O) = 0.$7FFF5A194BA $Q(O) = 0.$7F $r(O) = 0.$FF5A194BA

Step 9

Multiply $Q(0)$ by $(dp)$ and add to $r(0)$:

$[Q(0)](dp)+r(0) = Q(1), r(1)$ $Q(1) = $ .FF $r(1) = $ .FE80DDF

Step 10

Multiply $Q(1)$ by $(dp)$ and add to $r(1)$:

$Q(2) = $ .FF $r(2) = $ .CAF87A

Step 11

Multiply $Q(2)$ by $(dp)$ and add to $r(2)$;

$Q(2)\ (dp)+r(2) = Q(3), r(3)$ $Q(3) = $ .CC $r(3) = $ .4295

The quotient $Q$ equal to .7FFFFFCC can be checked by multiplying that value of $Q$ times the original divisor $Do$ and adding the remainder $r(3)$ to the product and the answer obtained therefrom will be the original dividend No. When adding the remainder $r(3)$ to the product, it must be appropriately weighted by adding eight leading 0's to form .000000004295. An alternative technique for checking the division is to multiply the quotient $Q$ by the normalized divisor $D$ and adding the remainder $r(3)$ appropriately shifted to the product. The appropriate shift is six leading 0's corresponding to the original binary normalization shift of $Do$. When appropriately shifted, the remainder which is added is .0000002F.

While the invention has been particularly shown and described with reference to preferred embodiments thereof, it will be understood by those skilled in the art that the foregoing and other changes in form and details may be made therein without departing from the spirit and scope of the invention.

We claim:

1. A data processing system storing a dividend $N$ and a divisor $D$ which are operated upon to form a quotient $Q$, where $Q$ includes n quotient bytes $Q(0)$, $Q(1)$,..., $Q(i)$, $Q(i+1)$,..., $Q(n-1)$, said system comprising, a first unit for concurrently adding and multiplying operands, a second unit for adding, for one's complementing and for two's complementing operands, a shifter unit for shifting operands, a plurality of registers for storing operands, including said dividend $N$ and said divisor $D$, control means for controlling the processing of operands, a table-lookup unit for storing a plurality of first approximate reciprocal divisors;

means, responsive to said control means for gating high-order bits of said divisor $D$ from said registers to said table-lookup unit to gate a corresponding one, $(Dt)^{-1}$, of said first approximate reciprocal divisors into said registers;

means, responsive to said control means, for gating the approximate reciprocal divisor $(Dt)^{-1}$ and the divisor $D$ from said registers to said first unit to form the product $D(Dt)^{-1}$ which equals $[1-(dt)]$ where $(dt)$ is an initial multiplier, means, responsive to said control means, connecting said first unit to said registers for storing $[1-(dt)]$ in said registers;

means, responsive to said control means, for gating $[1-(dt)]$ from said registers to said second unit for two's complementing $[1-(dt)]$ to form $[1+(dt)]$, means, responsive to said control means, connecting said second unit to said registers for storing $[1+(dt)]$ in said registers;

means, responsive to said control means, for gating $[1+(dt)]$ and the approximate reciprocal divisor $(Dt)^{-1}$ from said registers to said first unit to form the product $[1+(dt)](Dt)^{-1}$ which equals a second approximate reciprocal divisor $(Dp)^{116\ 1}$;

means, responsive to said control means, connecting said first unit to said registers for storing $(Dp)^{-1}$ in said registers.

2. The apparatus of claim 1 including, means, responsive to said control means, for gating the approximate reciprocal divisor $(Dp)^{-1}$ and the divisor $D$ from said registers to said first unit to form the product $D(Dp)^{-1}$ which equals $[1-(dp)]$ where $(dp)$ is an iterative multiplier;

means, responsive to said control means, connecting said first unit to said registers for storing $[1-(dp)]$ in said registers, means, responsive to said control means, for gating $[1-(dp)]$ from said registers to said second unit to form the one's complement of $[1-(dp)]$ equal to the iterative multiplier $(dp)$; and means, responsive to said control means, connecting said second unit to said registers for storing the iterative multiplier $(dp)$ in said registers.

3. The system of claim 2 in which $No$ is a given dividend stored in said registers and $Do$ is a given divisor stored in said registers, said system including, means, responsive to said control means, connecting said registers to said shifting unit for binary normalizing said divisor $Do$ by shifting $y$ bits to truncate all high-order 0's thereby forming said divisor $D$, means, responsive to said control means, connecting said shifter unit to said registers for storing said divisor $D$ in said registers, means, responsive, to said control means, for gating said dividend $No$ to said shifter unit for shifting the dividend $No$ $y$ bits thereby forming said dividend $N$, means, responsive to said control means, connecting said shifter unit to said registers for storing said dividend $N$ in said registers.

4. The apparatus of claim 2 including, means, responsive to said control means, for gating $(Dp)^{-1}$ and $N$ to said first unit for multiplying $(Dp)^{-1}$ by $N$ to form $Q(0)$, $r(0)$, where $r(0)$ is the $0^{th}$ truncated remainder of the truncated remainders $r(i)$, means, responsive to said control means, connecting said first unit to said registers for storing $Q(0)$, $r(0)$ in said registers, means, responsive to said control means, for gating $(dp)$, $Q(0)$ and $r(0)$ to said first unit for multiplying $(dp)$ by $Q(0)$ and adding the product to $r(0)$ to form the term $Q(1)$, $r(1)$ where $r(1)$ is the $1^{st}$ truncated remainder of the truncated remainders $r(i)$, means, responsive to said control means, connecting said first unit to said register means for storing $Q(1)$, $r(1)$ in said registers, means, responsive to said control means, for iteratively gating $(dp)$, $Q(i)$, and $r(i)$ from said registers to said first unit for iteratively multiplying $(dp)$ by $Q(i)$ and adding the product to $r(i)$ to form $Q(i+1)$, $r(i+1)$ for all values of $i$ from 1 to $(n-1)$, means, responsive to said control means, connecting to said first unit to said registers for iteratively storing $Q(i+1)$, $r(i+1)$ in said registers for all values of $i$ from 1 to $(n-1)$.

5. A data processing system storing a dividend $N$ and a divisor $D$ which are operated upon to form a quotient $Q$ where $Q$ includes $n$ non-overlapping quotient bytes $Q(0)$, $Q(1)$,...,$Q(i)$, $Q(i+1)$,...,$Q(n-1)$, where each byte includes $x$ binary bits, said system comprising, a first unit for concurrently adding and multiplying operands, a second unit for adding, for one's complementing and for two's complementing operands, a shifter unit for shifting operands, a plurality of registers for storing operands, including said dividend $N$ and said divisor $D$, control means for controlling the processing of operands, a table-lookup unit for storing a plurality of first approximate reciprocal divisors of the form $(Dt)^{-1}$ where $(Dt)$ does not differ from $D$ by more than $2^{-(x/2)}$, means, responsive to said control means, for gating high-order bits of said divisor $D$ from said registers to address said table-lookup unit to access a corresponding one, $(Dt)_c^{-1}$, of said first approxiamte reciprocal divisors, means, responsive to said control means, connecting said table-lookup unit to said registers for storing said reciprocal divisor $(Dt)_c^{-1}$ in said registers, means, responsive to said control means, for gating said reciprocal divisor $(Dt)_c^{-1}$ and the divisor $D$ from said registers to said first unit to form the product $D(Dt)^{-1}$ which equals $[1-(dt)]$ where $(dt)$ is an initial multiplier, means, responsive to said control means, connecting said first unit to said registers for storing $[1-(dt)]$ in said registers;

means, responsive to said control means, for gating $[1-(dt)]$ from said registers to said second unit for two's complementing $[1-(dt)]$ to form $[1+(dt)]$, means, responsive to said control means, connecting said second unit to said registers for storing $[1+(dt)]$ in said registers;

means, responsive to said control means, for gating $[1+(dt)]$ and the approximate reciprocal divisor $(Dt)^{-1}$ from said registers to said first unit to form the product $[1+(dt)]$ $(Dt)^{-1}$ which equals a second approximate reciprocal divisor $(Dp)^{-1}$ where $(Dp)$ does not differ from $D$ by more than $2^{-x}$, means, responsive to said control means, connecting said first unit to said registers for storing $(Dp)^{-1}$ in said registers.

6. A method of division in a data processing system storing a dividend $N$ and a divisor $D$ which are operated upon to form a quotient $Q$ where $Q$ includes $n$ non-overlapping quotient bytes $Q(O)$, $Q(l)$,...,$Q(i)$, $Q(i+1)$,..., $Q(n-1)$ and where each byte includes $x$ binary bits; said system having a first unit for concurrently adding and multiplying operands; having a second unit for adding, for one's complementing and two's complementing operands; having a plurality of registers for storing operands including said dividend $N$ and said divisor $D$; having control means for controlling the processing of operands; having a table-lookup unit for storing a plurality of first reciprocal divisors of the form $(Dt)^{-1}$ where $(Dt)$ does not differ from $D$ by more $2^{-(x/2)}$, the steps comprising, addressing said table-lookup unit with the high-order bits of $D$ to access a corresponding one, $(Dt)_c^{-1}$, of said first approximate reciprocal divisors, storing $(Dt)_c^{-1}$ in said register means, gating $(Dt)_c^{-1}$ and D to said first unit, multiplying $(Dt)_c^{-1}$ and D in said first unit to form $[1-(dt)]$ where $(dt)$ is an initial multiplier, storing $[1-(dt)]$ in said register means, gating $[1-(dt)]$ to said second unit, two's complementing $[1-(dt)]$ in said second unit to form $[1+(dt)]$, storing $[1+(dt)]$ in said register means, gating $[1-(dt)]$ and $(Dt)_c^{-1}$ to said first unit, multiplying $[1+(dt)]$ and $(Dt)_c^{-1}$ in said first unit to form a calculated reciprocal divisor $(Dp)^{-1}$ whereby $(Dp)$ does not differ from $D$ by greater than $2^{-x}$, storing $(Dp)^{-1}$ in said register means.

7. The method of claim 6 including the steps, gating $(Dp)^{-1}$ and $D$ to said first unit, multiplying $(Dp)^{-1}$ and $D$ in said first unit to form $[1-(dp)]$, storing $[1-(dp)]$ in said register means, gating $[1-(dp)]$ from said registers to said second unit, one's complementing $[1-(dp)]$ in said first unit to form $(dp)$ where $(dp)$ is an iterative multiplier, storing $(dp)$ in said registers, gating $(Dp)^{-1}$ and $N$ to said first unit, multiplying $(Dp)^{-1}$ and $N$ in said first unit to form $Q(0)$, $r(0)$ where $r(0)$ is a $0^{th}$ truncated remainder of the truncated remainder $r(i)$, storing $Q(0)$, $r(0)$ in said registers, gating $Q(0)$, $(dp)$, and $r(0)$ to said first unit, multiplying $Q(0)$ and $(dp)$ and adding $r(0)$ to the product in said first unit to form $Q(1)$, $r(1)$, storing $Q(1)$, $r(1)$ in said registers, iteratively gating $(dp)$, $Q(i)$, and $r(i)$ from said registers to said first unit for all values of $i$ from 1 to $(n-1)$, iteratively multiplying $(dp)$ by $Q(i)$ in said first unit to form the product $(dp)Q(i)$ and adding said product $(dp)Q(i)$ to $r(i)$ in said first unit to form $Q(i+1)$, $r(i+1)$ for all values of $i$ from 1 to $(n-1)$, iteratively storing $Q(i+1)$, $r(i+1)$ in said registers for all values of $i$ from 1 to $(n-1)$.

* * * * *